US005864794A

United States Patent [19]

Tasaki

[11] Patent Number: 5,864,794

[45] Date of Patent: Jan. 26, 1999

[54] SIGNAL ENCODING AND DECODING SYSTEM USING AUDITORY PARAMETERS AND BARK SPECTRUM

[75] Inventor: Hirohisa Tasaki, Kamakura, Japan

[73] Assignee: Mitsubishi Denki Kabushiki Kaisha, Tokyo, Japan

[21] Appl. No.: 947,765

[22] Filed: Oct. 9, 1997

Related U.S. Application Data

[63] Continuation of Ser. No. 405,712, Mar. 17, 1995.

[30] Foreign Application Priority Data

Mar. 18, 1994 [JP] Japan .................................... 6-049469

[51] Int. Cl.[6] ........................................................ G01L 3/00

[52] U.S. Cl. ............................................ 704/214; 704/211

[58] Field of Search ...................................... 395/2.2, 2.14

[56] References Cited

U.S. PATENT DOCUMENTS

| | | | |
|---|---|---|---|
| 5,040,217 | 8/1991 | Brandenburg et al. | 381/47 |
| 5,142,584 | 8/1992 | Ozawa | 381/36 |
| 5,185,800 | 2/1993 | Mahieux | 381/29 |
| 5,204,677 | 4/1993 | Akagiri et al. | 341/118 |
| 5,311,561 | 5/1994 | Akagiri | 375/122 |
| 5,450,522 | 9/1995 | Hermansky et al. | 395/2.2 |
| 5,535,300 | 7/1996 | Hall, II et al. | 395/2.36 |
| 5,537,647 | 7/1996 | Hermansky et al. | 395/2.2 |

FOREIGN PATENT DOCUMENTS

| | | | |
|---|---|---|---|
| 2053133 | 4/1992 | Canada | G10L 9/14 |
| 0129898 | 9/1986 | European Pat. Off. . | |
| 3-332967 | 10/1991 | Japan . | |
| 4-55899 | 2/1992 | Japan . | |
| 5-158495 | 6/1993 | Japan . | |
| WO91/06945 | 5/1991 | WIPO . | |
| WO94/25959 | 11/1994 | WIPO . | |

OTHER PUBLICATIONS

Wang et al., "Auditory Distortion Measure for Speech Coding," ICASSP '91, 493–96, 1991.

Deller, Jr. et al., "Discrete–Time Processing of Speech Signals," Prentice Hall, Upper Saddle River, NJ, 480–81, 506–16, 1987.

ICASSP 91 Speech Processing "Auditory Distortion Measure For Speeach Coding" S. Wang, et al.

IEEE Transactions on Acoustics, Speech, and Signal Processing "Suppression of Acoustic Noise in Speech Using Spectral Subtraction" Steven F. Boll.

*Primary Examiner*—David R. Hudspeth
*Assistant Examiner*—Vijay B. Chawan
*Attorney, Agent, or Firm*—Wolf, Greenfield & Sacks, P.C.

[57] ABSTRACT

A signal encoding system A1 includes a bark spectrum calculating device 2 for calculating a bark spectrum as a parameter based on an auditory model, a bark spectrum encoding device 3 for encoding the bark spectrum, a sound source calculating device 4 and a sound source encoding device 5. The bark spectrum calculating device 2 includes a power spectrum calculating device 6, a critical band integrating device 7, an equal loudness compensating device 8 and a loudness converting device 9. These devices are formed by engineering the functions and effects which are similar to those of the auditory model. The decoding process perform the conversion in the opposite direction. As a result, the signals can be encoded and decoded through less calculation in a manner well matching the human auditory characteristics. When speech signals are to be encoded, it can be realized through less calculation and memory while suppressing noise components other than the speech signal.

16 Claims, 6 Drawing Sheets

SIGNAL ENCODING AND DECODING SYSTEM USING AUDITORY PARAMETERS AND BARK SPECTRUM

This application is a continuation of application Ser. No. 08/405,712, filed Mar. 17, 1995.

BACKGROUND OF THE INVENTION

1. Field of the Invention

The present invention relates to a signal encoding system for encoding digital signals such as voice or sound signals with a high efficiency and a signal decoding system for decoding these encoded signals.

2. Description of the Prior Art

In signal encoding for compressing voice or sound signals into smaller information containing units, it is normal practice to select codes so that a preset distortion will be minimized. It is desirable that the measure of such a distortion matches the auditory sense of a human being. When a voice signal is to be encoded and if such a voice signal is superimposed by a noise signal, it is desirable to use a system capable of suppressing the noise component.

It is known that the human auditory system has a non-linear frequency response and a higher discrimination at lower frequencies and lower discrimination at higher frequencies. Such a discrimination is called the critical band width, and the frequency response is called the bark scale.

It is also known that the human auditory system has a certain sensitivity relating to the level of sound, that is, a loudness, which is not linearly proportional to the signal power. Signal powers providing an equal loudness are slightly different from one another, depending on the frequency. If a signal power is relatively large, a loudness is approximately calculated from the exponential function of the signal power multiplied by one of a number of coefficients that are slightly different from one another for every frequency.

It is further known that one of the characteristics of the human auditory system is a masking effect. The masking effect is where, if there is a disturbing sound, it will increase the minimum audible level at which the other signals can be perceived. The magnitude of the masking effect increases as a frequency to be used approaches the frequency of the disturbing sound, and varies depending on the width of differential frequency along the bark scale.

The details of such characteristics and their modeling in the human auditory system are described in Eberhard Zwicker, "Psychologic Acoustics", pp161–174, which was translated by YAMADA Yukiko and published by HISHIMURA SHOTEN, 1992.

Some signal encoding systems using a distortion scale well matching these auditory characteristics are described, for example, in Japanese Patent Laid-Open Nos. Hei 4-55899, Hei 5-268098 and Hei 5-15849.

Japanese Patent Laid-Open No. Hei 4-55899 introduces a distortion which is well matched to these auditory characteristics when the spectrum parameters of voice signals are encoded. The spectral envelope of the voice signals is first approximated to an all pole model, and certain parameters are then extracted as spectral parameters. The spectral parameters are subjected to a non-linear transform such as conversion into mel-scale and then encoded using a square-law distance as a distortion scale. The non-linearity of the frequency response in the human auditory system is thus introduced by the conversion to the mel-scale.

Japanese Patent Laid-Open No. Hei 5-268098 introduces a bark scale when the spectral forms of voice signals are substantially removed through short- and long-term forecasts, the residual signals then being encoded. The residual signals are converted into frequency domains. All the frequency components thus obtained are brought into a plurality of groups, each of which is represented only by grouped amplitudes spaced apart from one another with regular intervals on the bark scale. These grouped amplitudes are finally encoded. The introduction of grouped amplitudes provides an advantage in that the frequency axis is approximate conversion into a bark scale to improve the matching of the distortion in the encoding step or grouped amplitude to the auditory characteristics.

Japanese Patent Laid-Open No. Hei 5-158495 is to execute a plurality of voice encodings through auditory weighting filters having different characteristics so that an auditory weighting filter providing the minimum sense of noise will be selected. One method of evaluating the sense of noise is described, which calculates an error between an input voice signal and a synthesized signal and determines a loudness of such a error relative to the input voice signal, that is, noise loudness. The calculation of loudness also uses the critical band width and masking effect.

Another method of using a distortion scale well matched to the auditory characteristics is disclosed in S. Wang, A. Sekey and A. Gersho, "Auditory Distortion Measure for Speech Coding" (Proc. IC ASSP'91, pp.493–496, May 1991).

The S. Wang et al. method uses a parameter called a bark spectrum which is obtained by performing integration of the amplitude in the critical band of the frequency spectrum, pre-emphasis for equal loudness compensation and sone conversion into loudness. The bark spectra of the input voice and synthesized signals are then calculated to provide a simple square-law error between these two bark spectra, which is in turn used to evaluate a distortion between the input voice and synthesized signals. The integration of critical band models the non-linearity of the frequency axis in the auditory characteristics as well as the masking effect. The pre-emphasis and sone conversion model the characteristics relating to the loudness in the auditory characteristics.

A method of suppressing noise superimposed on voice signals is also known by S. F. Boll, "Suppression of Acoustic Noise in Speech Using Spectral Subtraction" (IEEE Trans. on Acoustics, Speech and Signal Processing, Vol. ASSP-27, No.2, pp.113–120, April 1979).

The S. F. Boll method presumes the spectral form of noise from non-speech sections and subtracts it from the spectra of all sections for suppressing the noise components in the following manner.

First of all, input signals are cut by hanning window for regular time intervals and converted into frequency spectra through the Fast Fourier Transform (FFT). The power of each of the frequency spectral components is then calculated to determine a power spectrum. The power spectra determined through a section judged to be a non-speech section are averaged to presume an average power spectrum of noise. The power spectrum of noise multiplied by a given gain is then subtracted from the power spectra throughout all the sections. Thus, variable noise components may instead be realized through the subtraction of noise to increase the sense of noise. Therefore, components made to be very small values through the subtraction are leveled to equal to the values in the previous and next sections after the subtraction.

It is then returned to an original signal by applying inverse FFT onto a frequency spectrum which has a phase spectrum equal to that of the frequency spectrum of the input signal and a power spectrum equal to the power spectrum after the leveling step. Finally, the resulting signal is reconstructed by maintaining it for a given time period.

However, the methods of the prior art have the following problems:

In Japanese Patent Laid-Open No. Hei 4-55899, the spectral envelop of voice signals approximates to the all pole model which is based on a voice signal generating mechanism. The optimum parameter order of the all pole model depends on vowel, consonant and/or speaker. Therefore, good approximation is not necessarily performed. To improve this problem, a system of presuming and determining the optimum parameter order has been proposed, but is rarely used because of its complicated analysis and synthesis. Voice signals superimposed by background or other noises raise another problem in that the all pole model will not be approximated. This method cannot overcome the above problem since only the non-linear conversion is executed for the parameter based on the all pole model to convert the frequency into a frequency well matching the auditory characteristics. Since the factors, such as loudness, masking effect and others, of the auditory characteristics are not contained therein, the resulting parameters will not be sufficiently matched to the auditory characteristics. The all pole model cannot be applied to the method of the prior art to encode sound signals well matching the auditory characteristics since the all pole model does not conform to general audio signals other than voice signals.

In place of the conversion into mel-scale, the parameter based on the all pole model may be temporarily converted into a frequency spectrum which is in turn converted into a bark spectrum. Therefore, the distortion scale used to encode the parameter based on the all pole model may be a bark spectrum distortion. Since such a conversion requires a very large amount of data to be processed, however, it can be used only in performing a vector quantization in which the conversion of all the codes has previously be made. The all pole model has further problems which are not expected to be improved in the near future.

Japanese Patent Laid-Open No. Hei 5-268098 uses the bark scale in encoding the residual signals. The bark scale only relates to the non-linearity of the frequency axis among the auditory characteristics and does not contain the other factors, such as loudness and/or masking effect, of the auditory characteristics. Therefore, the bark scale does not sufficiently match the auditory characteristics. An auditory model becomes significant only when it is applied to signals inputted into a person's ears. When the auditory model is applied to the residual signals as in the prior art, it cannot introduce the factors of the auditory characteristics other than the non-linearity of the frequency axis.

Japanese Patent Laid-Open No. Hei 5-158495 uses the noise loudness as a distortion scale for selecting the auditory weighting filter. This can only be used to select the auditory weighting filter, and cannot be used to provide a distortion scale in encoding voice signals. Such a distortion scale uses a signal distortion after the auditory weighting filter which weights a distortion created by the encoding in the axis of frequency so as to be hardly audible, based on the all pole model. Thus, the auditory weighting filter is empirically determined, but does not fully use the bark scale, loudness and masking in the auditory characteristics. In addition, the auditory weighting filter does not adapt to general audio signals other than voice signals since it is introduced from the parameters of the all pole model.

To improve such a method of the prior art, it may be proposed to introduce the concept of noise loudness as a distortion scale used on encoding. However, it must generate decoded signals for all the different codes of B powers of two (B: the number of bits of codes) and calculate noise loudness for all the decoded signals. This requires a huge amount of data to be processed, and cannot actually be realized.

The method of S. Wang et al. calculates a bark spectrum as a parameter based on an auditory model. However, its object is to evaluate various encoding systems through evaluation of bark spectrum distortions in decoded signals, but does not consider to use it as a distortion scale on encoding. If decoded signals can be generated for all the codes of B powers of two (B: the number of bits of codes) and bark spectra can be calculated for all the decoded signals, one may determine a codeword having the minimum bark spectrum distortion. However, this must also process a huge amount of data, and cannot actually be realized.

The method of S. F. Boll cuts input voices through a hanning window for regular time intervals for suppressing noise. The length of the hanning window and time interval become powers of two depending on the FFT. Although a voice encoding system also cuts input voices for regular time intervals, the time interval is not necessarily equal to that of the noise processing. Thus, the voices will be independently encoded after the noise suppression has been completed. This requires a large amount of data to be processed as well as a large amount of memory, with a complicated backfiling of signals. If these time intervals are coincident with each other, there are required more calculation and memory which are at least proportional to the number of points (256, 512, 1024, etc.) in the FFT.

Although the method of S. F. Boll actually reduces noise components through the subtraction of noise, the variations actually increase the auditory sense of noise. To improve such a problem, the S. F. Boll method simply levels the spectra. This is insufficient to improve the above problem relating to a certain form of noise.

SUMMARY OF THE INVENTION

It is therefore an object of the present invention to encode and decode signals through relatively little calculation in a manner well matching human auditory characteristics.

Another object of the present invention is to encode voice signals superimposed by noises other than the voice signals by suppressing the noise components through less calculation and memory in a manner well matching human auditory characteristics with reduced affects from the variations in noise.

According to one aspect of the present invention, a signal encoding system for an input signal is provided which includes means for calculating auditory model parameters which are based upon an auditory model, such as a bark spectrum. These auditory model parameters contain the auditory characteristics such as non-linearity of the frequency axis, loudness, and masking effect which can be encoded. The signal encoding system also includes a means for encoding the auditory model parameters, which are then provided as output encoded auditory model parameters. The encoded auditory model parameters provided as outputs to be transmitted or stored.

Significantly, the input signal can be encoded in a manner which well matches the auditory characteristics, reduces the amount of encoded information, and minimizes the degradation of quality of the encoded output.

According to another aspect of the present invention, a signal encoding system for an input signal is provided which includes a mechanism for calculating auditory model parameters which are based upon an auditory model, such as a bark spectrum. The signal encoding system also includes a mechanism for encoding the auditory model parameters, which are provided as output encoded auditory model parameters. These encoded auditory model parameters are then decoded to provide decoded auditory model parameters. The signal encoding system also includes means for converting the decoded auditory model parameters into output frequency spectrum parameters which represent the form of a frequency spectrum. The signal encoding system also includes a sound source codebook which stores sound source codewords and a mechanism for calculating a weight factor from the encoded auditory model parameters. The signal encoding system calculates a weighted distance between each of the sound source codewords in the sound source codebook multiplied by the frequency spectrum parameter and the input voice signal in a frequency band using the weighted factor to select and output one of the sound source codewords having the minimum weighted distance.

Advantageously, a sound source codeword can be selected which well matches the auditory characteristics since the sound source codeword with the minimum weighted distance is selected. Also, if the bark spectrum is used as a parameter based on the auditory characteristics, the weight factor used to search the sound source codewords can be determined through less calculation.

According to another aspect of the invention, a decoding system is provided which includes a mechanism for decoding auditory model parameters which have been encoded from parameters based on an auditory model to obtain decoded auditory model parameters. The decoding system also includes a mechanism for converting the decoded auditory model parameters into parameters representing the form of a frequency spectrum to form output frequency spectrum parameters, and synthesis means for generating a decoded signal from the frequency spectrum parameters.

Significantly, the present invention can decode the signal in a manner which well matches the auditory characteristics, since the encoded auditory model parameter is decoded to form a frequency spectrum parameter which is used in turn to generate a decoded signal.

DETAILED DESCRIPTION OF THE PREFERRED EMBODIMENTS

Embodiment 1

Figure 1:
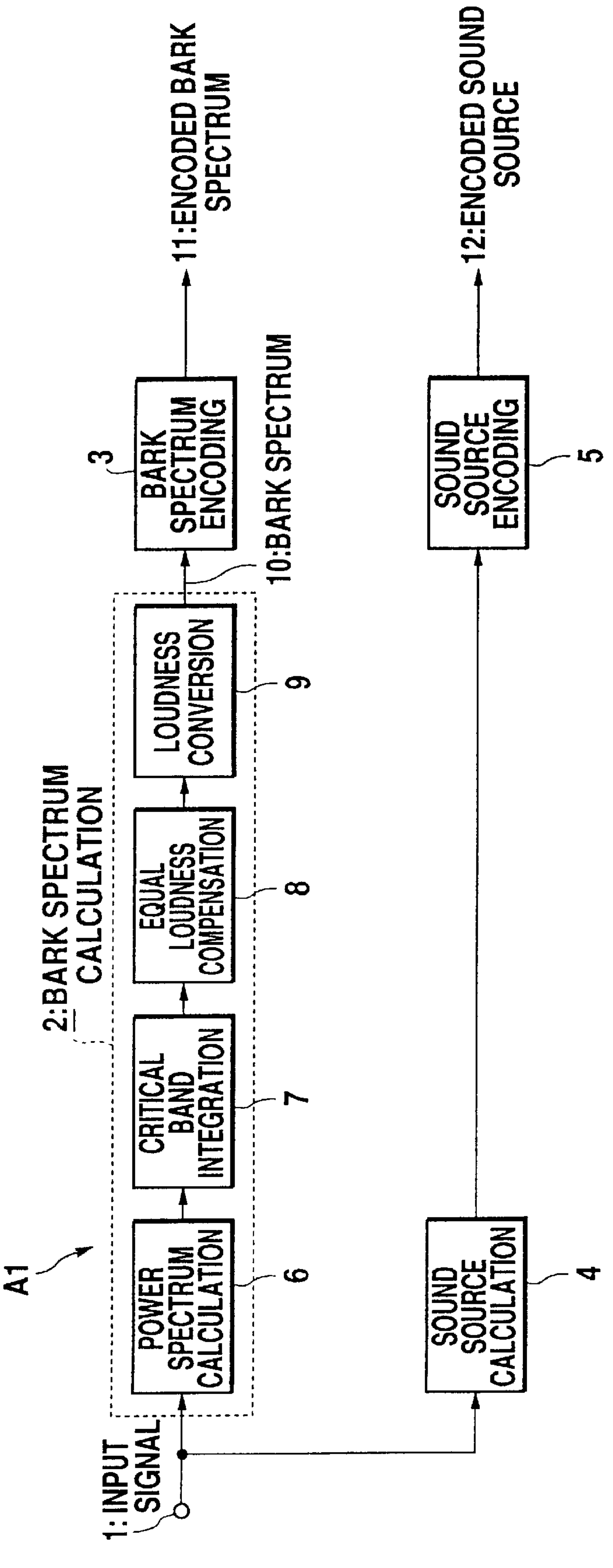
FIG. 1 is a block diagram of the first embodiment of a signal encoding system constructed in accordance with the present invention.

FIG. 1 is a block diagram of a signal encoding system A1 which is one embodiment of the present invention. In this figure, reference numeral 1 denotes an input signal; 2 a bark spectrum calculating means; 3 a bark spectrum encoding means; 4 a sound source calculating means; 5 a sound source encoding means; 6 a power spectrum calculating means; 7 a critical band integrating means; 8 an equal loudness compensating means; 9 a loudness converting means; 10 a bark spectrum; 11 an encoded bark spectrum; and 12 an encoded sound source.

The bark spectrum calculating means 2 comprises the power spectrum calculating means 6, the critical band integrating means 7 connected to the power spectrum calculating means 6, the equal loudness compensating means 8 connected to the critical band integrating means 7 and the loudness converting means 9 connected to the equal loudness compensating means 8. The bark spectrum encoding means 3 is connected to the loudness converting means 9. The sound source encoding means 5 is connected to the sound source calculating means 4.

Figure 2:
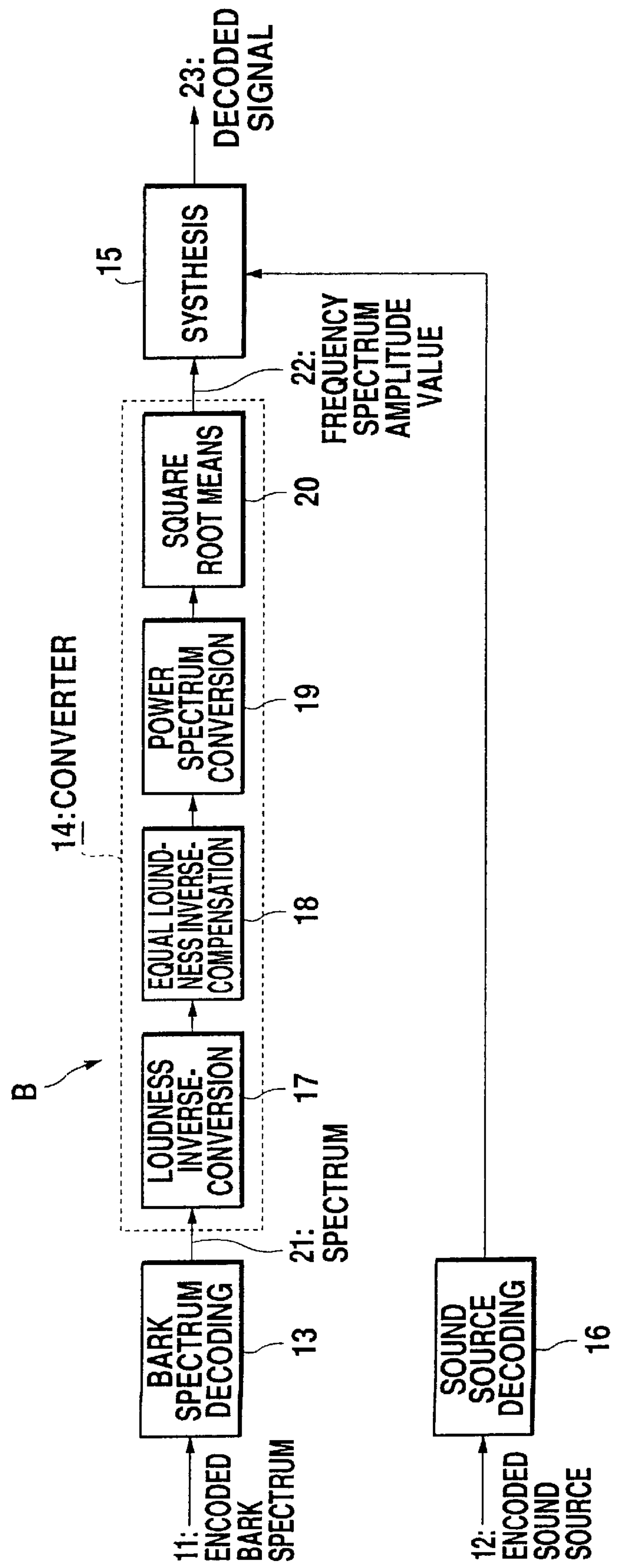
FIG. 2 is a block diagram of the first embodiment of a signal decoding system constructed in accordance with the present invention.

FIG. 2 is a block diagram of a signal decoding system B which is one embodiment of the present invention. In this figure, reference numeral 11 designates an encoded bark spectrum; 12 an encoded sound source; 13 a bark spectrum decoding means; 14 a converting means; 15 a synthesizing means; 16 a sound source decoding means; 17 a loudness inverse-conversion means; 18 an equal loudness inverse-compensation means; 19 a power spectrum conversion means; 20 a square root means; 21 a bark spectrum; 22 a frequency spectrum amplitude value; and 33 a decoded signal.

The converting means 14 is formed by the loudness inverse-conversion means 17, the equal loudness inverse-conversion means 18 connected to the loudness inverse-conversion means 17, the power spectrum converting means 19 connected to the equal loudness inverse-conversion means 18 and the square root means 20 connected to the power spectrum converting means 19. The power spectrum decoding means 13 is connected to the loudness inverse-conversion means 17.

The bark spectrum calculating means 2 of the signal encoding system is known as an auditory model which is modeled by engineering the functions of the human auditory mechanisms, that is, external ear, eardrum, middle ear, internal ear, primary nervous system and others. Although more precise auditory models are known in the art, the present invention uses an auditory model formed by the critical band integrating means 7, equal loudness compensating means 8 and loudness converting means 9, in view of the reduction of the calculation.

The embodiments of FIGS. 1 and 2 will now be described with respect to their operations.

It is assumed, for example, that a digital voice signal sampled with 8 KHz is first inputted, as an input signal 1, into the power spectrum calculating means 6 in the bark spectrum calculating means 2. The power spectrum calculating means 6 performs a spectrum conversion such as FFT (Fast Fourier Transform) on the input signal 1. The resulting frequency spectrum amplitude value is squared to calculate a power spectrum $Y_i$. The critical band integrating means 7 multiplies the power spectrum $Y_i$ by a given critical band filter function $A_{ji}$ to calculate an excitation pattern $D_j$ according to the following equation (1):

$$D_j = \sum_i \{A_{ji} Y_i\} \quad (2)$$

where the critical band filter function $A_{ji}$ is a function representing the intensity of a stimulus given by a signal having a frequency i to the j-th critical band. A mathematical model and a graph showing its function values are described in the known literature of S. Wang and others. A masking effect is introduced while being included in the critical band filter function $A_{ji}$.

The equal loudness compensating means 8 multiplies the excitation pattern $D_j$ by a compensation factor $H_j$ to calculate a compensated excitation pattern $P_j$ and to compensate such a property that the amplitude of a sound varies depending on the frequency even if the human auditory sense feels it as the same intensity.

The loudness converting means 9 converts the scale of the compensated excitation pattern $P_j$ into a sone scale indicating the magnitude of a sound felt by the human auditory sense, the resulting parameter being then outputted as a bark spectrum 10. The bark spectrum encoding means 3 encodes the bark spectrum 10 to form an encoded bark spectrum 11 which is in turn outputted therefrom.

The bark spectrum encoding means 3 may perform any one of various quantizations such as scalar quantization, vector quantization, vector-scalar quantization, multi-stage vector quantization, matrix quantization where a plurality of bark spectra close to one another in time are processed together and others. A distortion scale used herein is preferably square distance or weighted square distance. The weighting function in the weighted square distance may increase the weight into an order at which the value of the bark spectrum is larger or another order at which the bark spectrum varies more greatly between before and after a certain time.

Although the embodiment has been described for calculating the bark spectrum from the input signal by the use of the power spectrum calculating means 6, critical band integrating means 7, equal loudness compensating means 8 and loudness converting means 9, the present invention is not limited to such an arrangement, but may be applied to another arrangement wherein the critical band integrating function in the critical band integrating means 7 contains the compensation factor in the equal loudness compensating means 8, or to an analog circuit. Rather than the encoding of the output from the loudness converting means 9, the compensated excitation pattern from the equal loudness compensating means 8 or the excitation pattern from the critical band integrating means 7 may be encoded.

On the other hand, the sound source calculating means 4 first judges whether or not the input signal 1 represents voiced activity. If it is judged that the input signal represents voiced activity, the sound source calculating means 4 calculates a pitch frequency. The voiced/unvoiced judgment result is outputted therefrom with the calculated pitch frequency as sound source information. The sound source encoding means 5 encodes and outputs the sound source information as the encoded sound source 12.

The bark spectrum decoding means 13 in the signal decoding system B decodes the encoded bark spectrum 11 to form a bark spectrum 21 which is in turn outputted therefrom. The bark spectrum decoding means 13 operates in a manner directly reverse to that of the bark spectrum encoding means 3. More particularly, where the bark spectrum encoding means 3 performs the vector quantization using a given codebook, the bark spectrum decoding means 13 may also perform an inverse vector quantization using the same codebook.

The action of the loudness inverse-conversion means 7 in the converting means 14 corresponds to the inverse-conversion of the loudness converting means 9 and returns the sone scale to the power scale to output the compensated excitation pattern $P_j$. The action of the equal loudness inverse-compensation means 18 corresponds to the inverse-conversion of the equal loudness compensation means 8 and multiplies the compensated excitation pattern $P_j$ by the inverse number of the compensation factor $H_j$ to calculate the excitation pattern $D_j$. The action of the power spectrum converting means 19 corresponds to the inverse conversion of the critical band integrating means 7 and calculates the power spectrum $Y_i$ from the excitation pattern $D_j$ and band filter function $A_{ji}$ according to a method which will be described later. The square root means 20 determines a square root of each of the components in the power spectrum $Y_i$ to calculate the frequency spectrum amplitude value 22.

The sound source decoding means 16 decodes the encoded sound source 12 to form sound source information which is in turn ouputted therefrom toward the synthesizing means 15. The synthesizing means 15 uses the sound source information with the frequency spectrum amplitude value 22 to synthesize the decoded signal 23. Such a synthesization may be the same as in the synthesization of the harmonic coder. This is well-known for a person skilled in the art and will not be further described.

Although the sound source information has been described as to include the voiced/unvoiced judgment result and pitch frequency, it is also possible that a sound-in-band judgment result is added thereinto and that the synthesization is carried out according to a multi-band excitation (MBE) or any other method.

With speech and audio signals, the order of the excitation pattern $D_j$ is between 15 and 24 while the power spectrum $Y_i$ has a higher order. Thus, the conversion of the power spectrum converting means 19 cannot simply determine the result. The simplest conversion may be a sequential solution determining method such as the Newton-Raphson method or the like.

Figure 3:
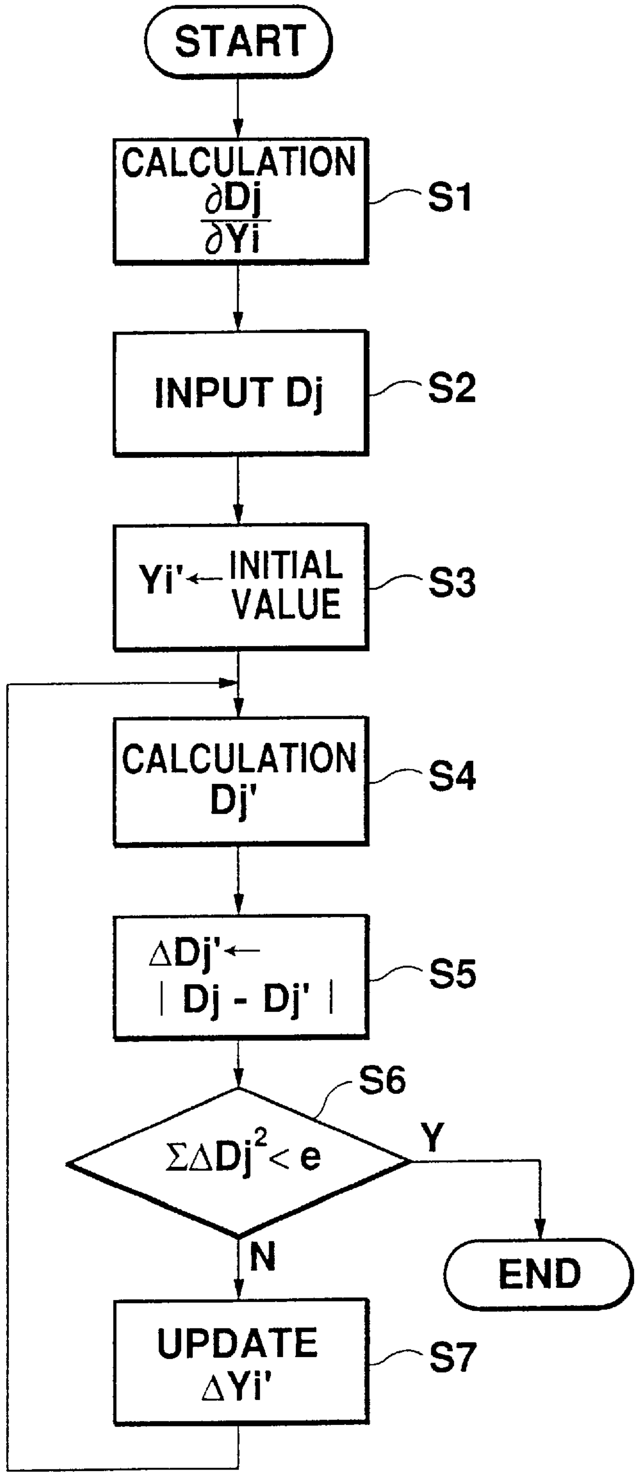
FIG. 3 is a flow chart illustrating the sequential solution determining process in the power spectrum converting means 19 of the first embodiment.

A sequential solution determining method will be described with reference to FIG. 3.

The power spectrum converting means 14 has the same means as the critical band integrating means 7. The power spectrum converting means 14 has previously used the critical band filter function $A_{ji}$ to calculate the partial differential of the excitation pattern $D_j$ for each of the components in the power spectrum $Y_i$ (step S1). When the excitation pattern $D_j$ is inputted into the power spectrum converting means (step S2), a temporary power spectrum $Y_i'$ is first set at an appropriate initial value (step S3). The power spectrum converting means 14 uses the same means as the critical band integrating means 5 to calculate a temporary excitation pattern $D_j'$ from the temporary power spectrum $Y_i'$ (step S4) and to calculate an error between the temporary excitation pattern $D_j'$ and the inputted excitation pattern $D_j$ (step S5). If the square summation of such errors is smaller than a given value e, the temporary power spectrum $Y_i'$ at that time is outputted as a power spectrum $Y_i$ (step S6). If the square summation is equal to or larger than the value e, these errors are used with the partial differential previously calculated to update the temporary power spectrum $Y_i'$ (step S7). The program is then returned to the step S4.

In such an arrangement, the parameter based on the auditory model containing the auditory characteristics such as the non-linearity of the frequency axis, the loudness being the amount of sense and the masking effect can directly be encoded and/or decoded. This provides a superior advantage over the prior art in that the signal can be encoded and/or decoded in a manner well matching the auditory characteristics or the subjective quality of a decoded signal. In other words, the amount of encoding information can be reduced while maintaining the degradation of the subjective quality as low as possible.

Particularly, due to the facts that the bark spectrum can simply be determined through less calculation, that the distance scale for simply calculating the square distance or weighted square distance of the bark spectrum well matches the subjective distortion and that the inverse conversion into the frequency spectrum form can be carried out through a relatively small amount of data to be processed, the parameter calculation, encoding and conversion can be realized through the real calculation by using the bark spectrum as a parameter based on the auditory model.

Since the generation of decoded signals as well as the calculation of parameters based on auditory models will not be carried out for all the codes, as would be case when it is desired to minimize the distortion in the parameter based on the auditory model through the prior art, since the present invention can decrease the amount of calculation in signal coding and decoding.

Since the approximation due to the all pole model as in the prior art can be eliminated, the present invention does not require the estimation of the optimum order as in the all pole model and can effectively treat the background noise.

Since the frequency spectrum amplitude value is used as a frequency spectrum parameter, various syntheses can easily be utilized in the present invention.

Embodiment 2

Figure 4:
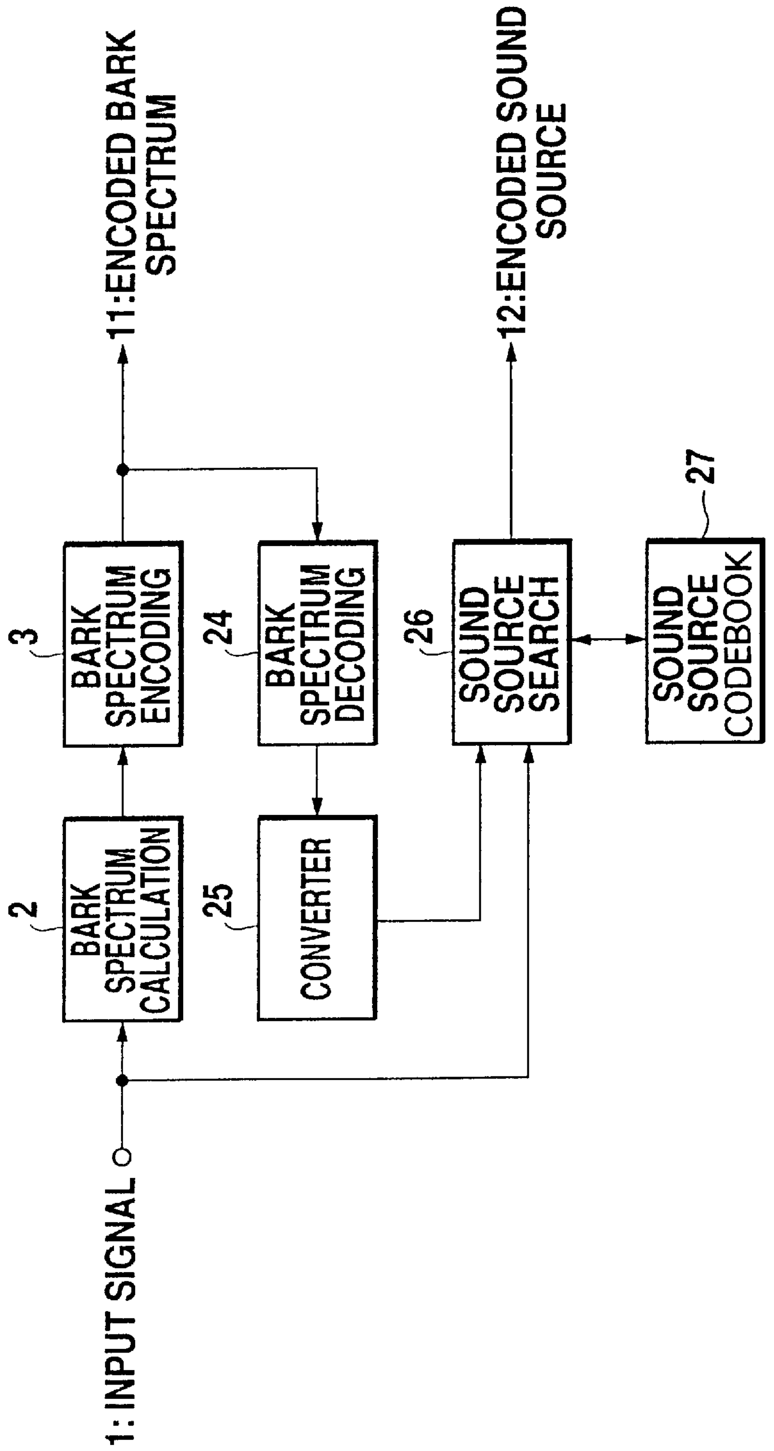
FIG. 4 is a block diagram of the second embodiment of a signal encoding system constructed in accordance with the present invention.

FIG. 4 is a block diagram of a signal encoding system A2 which is another embodiment of the present invention. In this figure, new components include a bark spectrum decoding means 24, a converting means 25, a sound source code searching means 26 and a sound source codebook 27. The other components are similar to those of FIG. 1, but will not be further described.

Referring to FIG. 4, the bark spectrum decoding means 24 is similar to the bark spectrum decoding means 13 shown in FIG. 2 and decodes the encoded bark spectrum 11 to form a bark spectrum which is in turn outputted therefrom toward the converting means 25. The converting means 25 is similar to the converting means 14 shown in FIG. 2 and converts the bark spectrum from the bark spectrum decoding means 24 into a frequency spectrum amplitude value.

The sound source searching means 26 first performs a spectrum conversion such as FFT (Fast Fourier Transform) on the input signal 1 to obtain the frequency spectrum amplitude value thereof. The sound source searching means 26 also calculates a weight factor $G_i$ indicating the square distortion of the bark spectrum as each component in the power spectrum $Y_i$ is finely changed. The sound source searching means 26 sequentially reads all the sound source codewords in the sound source codebook 27 and multiplies each of the sound source codewords by the frequency spectrum amplitude value outputted from the converting means 25 to calculate a square distance weighted by $G_i$ between the sound source codeword multiplied by the frequency spectrum amplitude value which is further multiplied by an appropriate gain, and the frequency spectrum amplitude value of the input signal 1. The sound source searching means 26 selects a sound source codeword and its gain which provide the minimum distance and which are outputted as encoded sound source 12.

The calculation of the weight factor $G_i$ may simply be carried out in the following manner. The partial differential of the compensated excitation pattern $P_i$ for each of the components in the power spectrum $Y_i$ is first calculated. The partial differential is invariable and may previously have been calculated from the critical band filter function $A_{ji}$ and the equal loudness conversion factor. Variations of the bark spectrum, as a fine perturbation is given to the respective components in the compensated excitation pattern $P_j$, are calculated, followed by the calculation of their square summation. Such a value can be calculated through a simple equation which uses the bark spectrum outputted from the bark spectrum decoding means 24 as a variable. When the matrix of the partial differentials of the compensated excitation pattern $P_i$ for each of the components in the calculated power spectrum $Y_i$ is multiplied by the square summation of the variations of the bark spectrum when the fine perturbation is given to the respective components in the compensated excitation pattern $D_j$, a desired weight factor $G_i$ is calculated.

Although the description has been made as to calculating the frequency spectrum amplitude value of the input signal 1 at the sound source searching means 26, it has actually been calculated by the power spectrum calculating means 6 in the bark spectrum calculating means 2. If the calculated frequency spectrum amplitude value is stored and used as required, the number of processing steps can be desirably reduced.

The encoded data in this embodiment may be decoded by the signal decoding system shown in FIG. 2 except that it requires the changing of the processing contents of the sound source decoding means and synthesizing means 16, 15. Such an exception will be described below.

The sound source decoding means 16 decodes the encoded sound source 12 to provide a sound source codeword and its gain which are in turn outputted therefrom toward the synthesizing means 15. The synthesizing means 15 multiplies the sound source codeword by the gain and further by the frequency spectrum amplitude value 22 to perform an inverse Fourier transform, thereby providing a decoded signal 23.

Such an arrangement enables the sound source signal to be encoded and/or decoded in a manner well matching the auditory characteristics, in addition to the advantages of the first embodiment. If the bark spectrum is used as a parameter based on the auditory characteristics, the weight factor used to search the sound source codes can be determined through less calculation.

Embodiment 3

Figure 5:
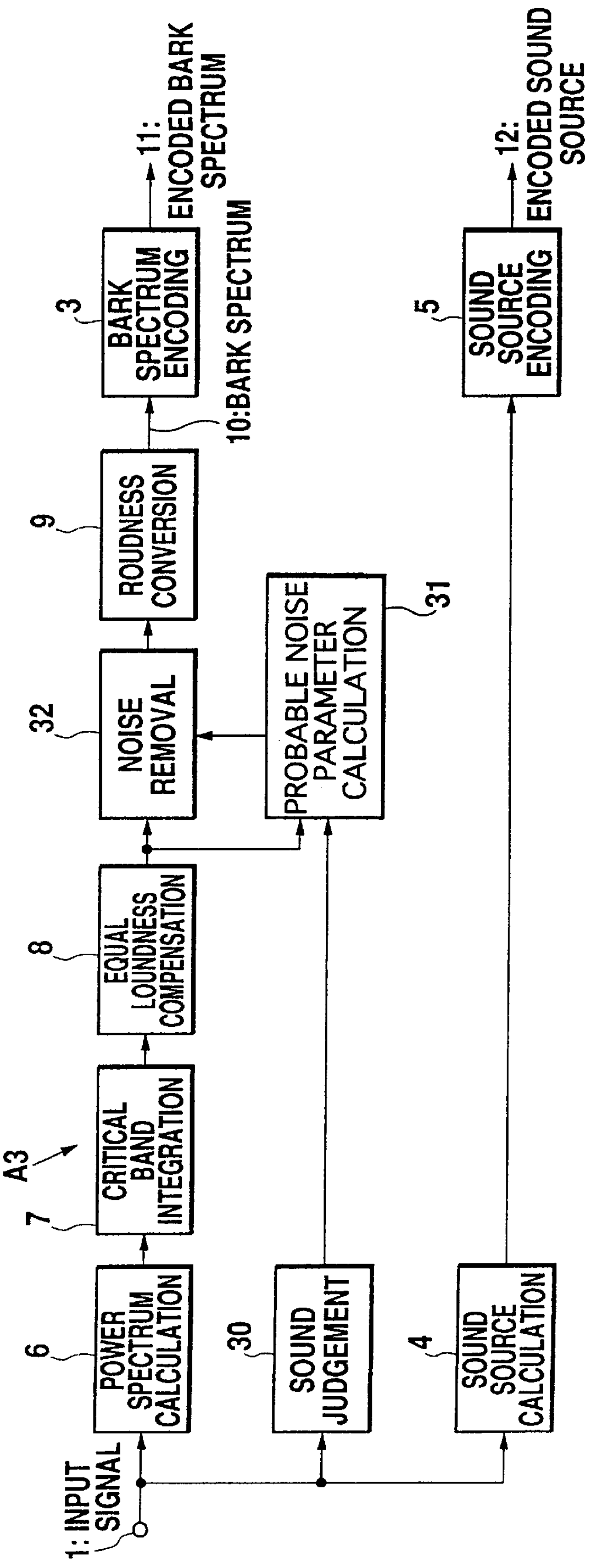
FIG. 5 is a block diagram of the third embodiment of a signal encoding system constructed in accordance with the present invention.

FIG. 5 is a block diagram of a signal encoding system A3 which is still another embodiment of the present invention. In this figure, new parts include a sound Judging means 30, a probable noise parameter calculating means 31 and a noise removing means 32. The other parts are similar to those of FIG. 1 and will not be further described.

Referring to FIG. 5, the sound judging means 30 analyzes the input signal 1 to judge whether the input signal 1 is a speech or non-speech section, thereby outputting a sound judgment result. If the sound judgment result indicates the non-speech section, the probable noise parameter calculating means 31 uses the compensated excitation pattern outputted from the equal loudness compensating means 8 to update the probable noise parameter stored therein. The updating may be performed by the moving average method or by calculating an average of compensated excitation patterns stored with respect to the adjacent non-speech sections. If the sound judgment result indicates the speech section, the noise removing means 32 subtracts the probable noise parameter stored in the probable noise parameter calculating means 31 and multiplied by a given gain from the compensated excitation pattern outputted by the equal loudness compensating means 8 to form a newly compensated excitation pattern which is in turn outputted therefrom toward the loudness converting means 9.

The noise removing means 32 may perform not only the subtraction with respect to the speech section, but also the subtraction with respect to the non-speech section. Alternatively, the noise removing means 32 may multiply the compensated excitation pattern outputted from the equal loudness compensating means 8 when the input signal indicates the non-speech section by a gain smaller than 1.0 to form a newly compensated excitation pattern which is in turn outputted therefrom toward the loudness calculating means 9.

In addition to the advantages of the embodiment 1, such an arrangement can reduce the calculation and memory used to suppress the noise without the need of any complicated signal buffering step since the suppression of noise is executed depending on the signal encoding process. The suppression of noise equivalent to the prior art such as the S. F. Boll method can be provided through less calculation and memory which are proportional to the order of the bark spectrum equal to about 15.

The prior art was more greatly affected by variations of the noise since the subtraction was carried out for every frequency component. However, the present invention can reduce the effects from the noise variations since such variations are reduced by smoothing in the bark spectrum obtained by integrating the frequency components. The leveling well matches the auditory characteristics and can provide an improved decoding quality over the simple leveling technique of the prior art.

The noise removing means 32 may be disposed on the output side of the loudness converting means 9, rather than between the equal loudness compensating means 8 and the loudness converting means 9.

However, the loudness converting means 9 performs the exponential conversion in changing the power scale to the sone scale. If the noise removing means 32 is located on the output side of the loudness converting means 9, one must consider the exponential conversion in the loudness converting means 9. Thus, the noise calculated at the probable noise parameter calculating means 31 cannot simply be subjected to the subtraction. If the noise removing means 32 is located between the equal loudness compensating means 8 and the loudness converting means 9, the calculation can be more simply made.

Embodiment 4

Although the embodiment 3 has been described as to a form provided by adding the sound judging means 30, probable noise parameter calculating means 31 and noise removing means 32 into the structure of the embodiment 1, the embodiment 4 may be constructed by similarly adding the sound judging means 30, probable noise parameter calculating means 31 and noise removing means 32 into the structure of the embodiment 2.

Such an arrangement provides not only the advantages of the embodiment 3, but is also advantageous in that the weight factor calculated by the sound source searching means 26 and used to calculate the distance can automatically be reduced at frequencies having higher rates of noise, to improve the intelligibility of the decoded signal.

Embodiment 5

Although the embodiments 1 to 4 have been described as to the conversion by the use of a sequential solution determining method such as the Newton-Raphson method in the power spectrum converting means 19 in the converting means 14 and 25, this may be replaced by an approximate solution determining method which will be described below.

The approximate solution determining method determines a solution by approximating a finally calculated N-th order power spectrum $Y_i$ using M-th order variable vector $Z_j$ of the same order as that of the bark spectrum and a M×N matrix R representing a fixed interpolation previously given as shown in an equation (2):

$$Y=RZ \tag{2}$$

where $Y=[Y_1, Y_2, \ldots Y_N]^T$ and $Z=[Z_1, Z_2, \ldots Z_M]^T$.

Figure 6:
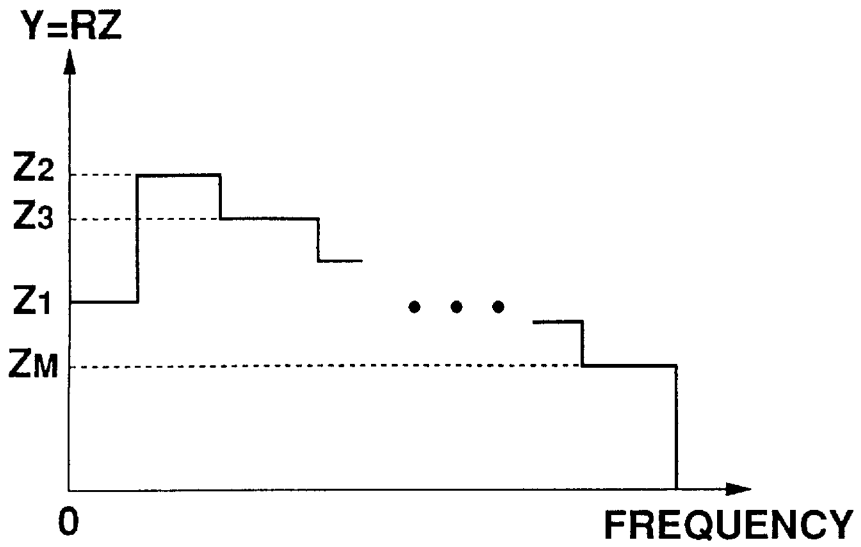
FIG. 6 is a graph illustrating a matrix which represents the interpolation in the fifth embodiment of the present invention.
Figure 7:
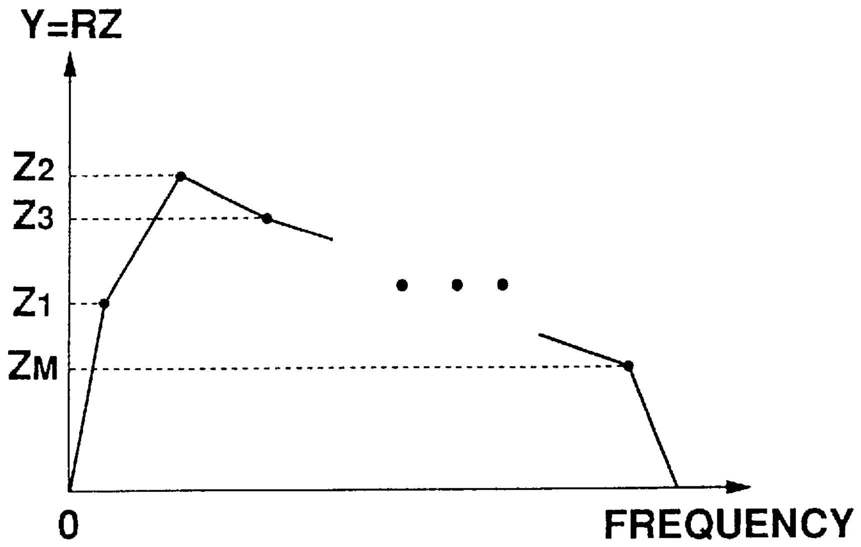
FIG. 7 is a graph illustrating a matrix which represents the interpolation in the fifth embodiment of the present invention.

The matrix R, that is, RZ may be one providing such a pattern as shown in FIG. 6 or 7. The variable vector $Z_j$ corresponds to the frequency spectrum amplitude value.

The excitation pattern $D_j$ is represented by an equation (3) using an N×N matrix E which has the power spectrum of the sound source as diagonal component and an N×M matrix A defined by the critical band filter function $A_{ji}$.

$$D=AEY=AERZ \tag{3}$$

where $D=[D_1, D_2, \ldots D_M]^T$.

Since AER is an M×M matrix, an inverse matrix can be calculated. By deforming the equations (2) and (3), the following equation (4) can be introduced.

$$Y=R(AER)^{-1}D \tag{4}$$

If the power spectrum E of a sound source is calculated, the equation (4) can be used to execute the conversion of the excitation pattern into the power spectrum Y.

Where the equation (4) is to be applied to the power spectrum converting means 19 in the converting means 14, the sound source information from the sound source decoding means 16 may be used to calculate the power spectrum of the sound source. When the equation (4) is to be applied to the power spectrum converting means 19 in the converting means 25, an immediately previous sound source is used as a temporary sound source to calculate its power spectrum E which is in turn used to perform one search at the sound source searching means 26. Thus, the power spectrum of sound source may be calculated to perform the re-conversion at the power spectrum converting means 19 and to make the re-conversion at the sound source searching means 26. The temporary sound source may be inverse-converted into the power spectrum after the residual signal due to the all pole model and the input signal 1 have been cepstrum-analyzed with a 20 or lower order term in the resulting cepstrum being removed.

The power spectrum calculated by the conversion in the approximate solution determining method may be used as an initial value in the sequential solution determining method described in connection with FIG. 3 to reduce an error in approximation. Such an arrangement can execute the conversion of the bark spectrum into the frequency spectrum amplitude value through less calculation than the sequential solution determining method to reduce the amount of data to be processed in the signal encoding and decoding systems.

Embodiment 6

In the embodiments 1 to 5, the power spectrum calculating means 6 and critical band integrating means 7 in the bark spectrum calculating means 2 may be formed by means for integrating a group of band pass filters imitating the characteristics of a critical band filter and means for integrating powers. More particularly, assuming that a cycle of extracting and encoding parameters (which will be called "frame) is 20 msec. and that the spectrum of an input signal is stationary within such a frame, the outputs of the band pass filters within the frame are gradually integrated. Means for integrating powers may be replaced by a low pass filter. The characteristics including the equal loudness compensating means 8 may be provided.

In such an arrangement, the amount of data to be processed can be reduced when the number of orders of the filters is relatively small and if the cycle of calculating the bark spectrum is relatively short.

Embodiment 7

In the embodiment 1 to 6, the segment quantization may be carried out by the bark spectrum encoding means 3 previously storing a plurality of bark spectra approximating to one another in time. With the segment quantization, the encoding characteristics are greatly influenced by determination of the inter-segment boundaries. It is therefore preferable to take a part wherein the variable speed, over time, of the bark spectrum is maximum or minimum as a boundary or that this is used as an initial value to determine a boundary such that the encoded distortion in the bark spectrum becomes minimum.

Such an arrangement can provide an advantage in that the segment boundary can be determined to reduce the distortion in the auditory sense, in addition to the advantages in the embodiments 1 to 6.

Embodiment 8

In the embodiments 1 to 7, the critical band integrating means 7 may include a plurality of critical band filter functions; the equal loudness compensating means 8 may include a plurality of compensation factors; and the loudness converting means 9 may include a plurality of conversion properties for converting the power scale into the sone scale. These variables may be combined to form a plurality of sets which are in turn selected by a user, if necessary. For example, one set may include a conversion property imitating the normal auditory characteristics, a critical band filter function and a compensation factor while another set may include another conversion property imitating the slightly degraded auditory characteristics of an old person, another critical band filter function and another compensation factor. In addition, the other set may include a conversion property imitating the auditory characteristics of a person who is hard of hearing, a critical band filter function and a compensation factor. A selected set is informed to the loudness inverse-conversion means 17, equal loudness inverse-compensation means 18 and power spectrum converting means 19 in the converting means 14, 25, the conversion properties, critical band filter functions and compensation factors used therein being operatively associated with those of the selected set.

Such an arrangement can provide the advantages similar to those of the embodiments 1 to 7 to the degraded auditory characteristics of the old and other persons who are hard of hearing. The signals can be encoded and/or decoded in a manner well matching the auditory characteristics or the subjective quality of decoded signal, in comparison with the prior art.

Embodiment 9

In the converting means 14 according to the embodiments 1 to 8, the loudness inverse-conversion means 17 may include a plurality of conversion properties of the power scale into the sone scale; the equal loudness inverse-compensation means 18 may include a plurality of critical band filter functions; and the power spectrum converting means 19 may include a plurality of compensation factors. These variables may be combined to form a plurality of sets which are in turn selected by a user, if necessary. For example, one set may include a conversion property imitating the normal auditory characteristics, a critical band filter function and a compensation factor while another set may include another conversion property imitating the slightly degraded auditory characteristics of an old person, another critical band filter function and another compensation factor. In addition, the other set may include a conversion property imitating the auditory characteristics of a person who is hard of hearing, a critical band filter function and a compensation factor.

Such an arrangement can provide a decoded signal which can easily be heard by an old or other persons who are hard of hearing.

As described, the first aspect of the present invention can encode the signals in a manner well matching the auditory characteristics since it calculates a parameter based on an auditory model, this parameter being directly encoded. In other words, the information of encoding can be reduced while maintaining the subjective quality as low as possible.

Since the generation of composite sounds as well as the calculation of parameters based on auditory models will not be carried out for all the codes as would be case when it is desired to minimize the distortion in the parameter based on the auditory model through the prior art, since the present invention can decrease the amount of calculation in signal coding and decoding.

Since the approximation due to the all pole model as in the prior art can be eliminated, the present invention does not require the estimation of the optimum order as in the all pole model and can effectively treat the background noise.

The second aspect of the present invention can encode the sound source signal well matching the auditory characteristics in addition to the advantages of the first aspect since the parameter based on the auditory model is calculated and directly encoded or decoded with the decoded parameter being used to calculate the weight factor which is in turn used to search the sound source codes.

The third aspect of the present invention can calculate and encode the parameters through less calculation in addition to the advantages of the first and second aspects since the bark spectrum is used as a parameter based on the auditory model in the signal encoding systems of the first and second aspects.

In the signal encoding system of the second aspect, the third aspect of the present invention can determine the weight factor used to calculate the distance through less calculation.

The fourth aspect of the present invention can execute the noise suppression depending on the signal encoding to reduce the calculation and memory for the noise suppression without the need for any complicated signal buffering step in addition to the advantages of the first to third aspects since the average auditory model parameter of noise is estimated from the auditory model parameters in the non-speech section and removed from the auditory model parameter in the speech section to suppress the noise components before the auditory model parameters are encoded. When the bark spectrum is When the bark spectrum is used as an auditory model parameter, the noise suppression equivalent to that of the prior art can be provided through less calculation and memory which are proportional to the order of the bark spectrum equal to about 15.

Although the prior art was greatly affected by the variations of noise due to the subtraction for every frequency component, the third aspect of the present invention can level and reduce the variations of the auditory model parameter in the direction of frequency to reduce the influence due to the variations of noise. Such a leveling well matches the auditory characteristics and can improve the quality of decoding over the simple leveling process of the prior art.

In the signal encoding system of the second aspect, the fourth aspect of the present invention can improve the intelligibility of a decoded signal since the weight factor used to calculate the distance is automatically reduced at frequencies having higher rates of noise.

The fifth aspect of the present invention can encode the signal well matching the auditory characteristics since the critical band integrating means introduces the masking effect; the equal loudness compensating means introduces the equal loudness property; and the loudness converting means introduces the sone scale property.

The sixth aspect of the present invention can easily perform the calculation by removing the noise from the excitation pattern outputted by the equal loudness compensating means.

The seventh aspect of the present invention can encode the signal well matching the auditory characteristics since the auditory model parameter is converted into the frequency spectrum parameter which is in turn used to generate the decoded signal.

The eighth aspect of the present invention perform the inverse-conversion into the frequency spectrum parameter through relatively little calculation to execute the conversion through the real calculation in addition to the advantage of the seventh aspect since the bark spectrum is used as the auditory model parameter in the signal decoding system of the seventh aspect.

The ninth aspect of the present invention can easily be applied to any one of various syntheses in addition to the advantages of the fifth and sixth aspects since the frequency spectrum amplitude value is used as the frequency spectrum parameter in the signal decoding systems of the seventh and eighth aspects.

The tenth aspect of the present invention can encode the signal well matching the auditory characteristics since the sone scale property is removed by the loudness inverse-compensation means; the equal loudness property is removed by the equal loudness inverse-compensation means; and the critical band filter function property is removed by the power spectrum converting means.

The eleventh and twelfth aspects of the present invention can execute the conversion of the bark spectrum into the frequency spectrum amplitude value through less calculation to reduce the amount of data to be processed in the signal encoding and decoding systems since the frequency spectrum amplitude value is represented by the approximate equation having the central frequency spectrum amplitude value of the same order as that of the bark spectrum to perform the approximate conversion of the bark spectrum into the frequency spectrum amplitude value.

I claim:

1. A signal encoding system comprising:

auditory model parameter calculating means for calculating a parameter based on an auditory model to form an output auditory model parameter; and auditory model parameter encoding means for encoding the auditory model parameter to form an output encoded auditory model parameter wherein the auditory model parameter calculating means comprises:

power spectrum calculating means for calculating the power spectrum of an input signal;

critical band integrating means for multiplying the power spectrum calculated by the power spectrum calculating means by a critical band filter function to calculate a pattern of excitation;

equal loudness compensating means for multiplying the pattern of excitation calculated by the critical band integrating means by a compensation factor representing the relationship between the magnitude and equal loudness of a sound for every frequency to calculate a compensated excitation pattern; and loudness converting means for converting the power scale of the compensated excitation pattern calculated by the equal loudness compensating means into a sone scale to calculate a Bark spectrum.

2. A signal encoding system as defined in claim 1, further comprising:

sound-existence judging means for judging an input signal with respect to whether it represents speech activity or non-speech activity;

probable noise parameter calculating means for calculating the average auditory model parameter of noise from a plurality of said auditory model parameters to form an output probable noise parameter when the input signal represents non-speech activity; and noise removing means for removing a component corresponding to said probable noise parameter from said auditory model parameter when the input signal represents speech activity.

3. A signal encoding system as defined in claim 1, further comprising:

sound-existence judging means for judging an input signal with respect to whether it represents speech activity or non-speech activity; and probable noise parameter calculating means for calculating the average auditory model parameter of noise from a plurality of said auditory model parameters to form an output probable noise parameter when the input signal represents non-speech activity.

4. A signal encoding system which encodes an input signal, the signal encoding system comprising:

auditory model parameter calculating means for calculating a parameter based on an auditory model to form an output auditory model parameter;

auditory model parameter encoding means for encoding the auditory model parameter to form an output encoded auditory model parameter;

auditory model parameter decoding means for decoding the encoded auditory model parameter to form an output decoded auditory model parameter;

converter means for converting said decoded auditory model parameter into a parameter representing the form of a frequency spectrum to form an output frequency spectrum parameter;

a sound source codebook storing a plurality of sound source codewords; and sound source codeword selecting means for calculating a weight factor from said encoded auditory model parameter and for calculating a weighted distance between each of the sound source codewords in said sound source codebook multiplied by said frequency spectrum parameter and the input signal in a frequency band using said weight factor to select and output one of said sound source codewords having the minimum weighted distance.

5. A signal encoding system as defined in claim 4 wherein it uses a bark spectrum as an auditory model parameter.

6. A signal encoding system as defined in claim 5, further comprising:

sound-existence judging means for judging the input signal with respect to whether it represents speech activity or non-speech activity;

probable noise parameter calculating means for calculating the average auditory model parameter of noise from a plurality of said auditory model parameters to form an output probable noise parameter when the input signal represents non-speech activity; and noise removing means for removing a component corresponding to said probable noise parameter from said auditory model parameter when the input signal represents speech activity.

7. A signal encoding system as defined in claim 5 wherein the auditory model parameter calculating means comprises:

power spectrum calculating means for calculating the power spectrum of an input signal;

critical band integrating means for multiplying the power spectrum calculated by the power spectrum calculating means by a critical band filter function to calculate a pattern of excitation;

equal loudness compensating means for multiplying the pattern of excitation calculated by the critical band integrating means by a compensation factor representing the relationship between the magnitude and equal loudness of a sound for every frequency to calculate a compensated excitation pattern; and loudness converting means for converting the power scale of the compensated excitation pattern calculated by the equal loudness compensating means into a sone scale to calculate a bark spectrum.

8. A signal encoding system as defined in claim 5, further comprising:

sound-existence judging means for judging the input signal with respect to whether it represents speech activity or non-speech activity; and probable noise parameter calculating means for calculating the average auditory model parameter of noise from a plurality of said auditory model parameters to form an output probable noise parameter when the input signal represents non-speech activity and wherein the auditory model parameter calculating means comprises:

power spectrum calculating means for calculating the power spectrum of the input signal;

critical band integrating means for multiplying the power spectrum calculated by the power spectrum calculating means by a critical band filter function to calculate a pattern of excitation;

equal loudness compensating means for multiplying the pattern of excitation calculated by the critical band integrating means by a compensation factor representing the relationship between the magnitude and equal loudness of a sound for every frequency to calculate a compensated excitation pattern;

removing a noise component corresponding to said probable noise parameter from a compensated excitation pattern to calculate a compensated excitation pattern without noise when the input signal represents speech activity; and loudness converting means for converting the power scale of the compensated excitation pattern without noise into a sone scale to calculate a bark spectrum.

9. A signal encoding system as defined in claim 2, further comprising:

sound-existence judging means for judging the input signal with respect to whether it represents speech activity or non-speech activity;

probable noise parameter calculating means for calculating the average auditory model parameter of noise from a plurality of said auditory model parameters to form an output probable noise parameter when the input signal represents non-speech activity; and noise removing means for removing a component corresponding to said probable noise parameter from said auditory model parameter when the input signal represents speech activity.

10. A signal encoding system as defined in claim 4, further comprising:

sound-existence judging means for judging the input signal with respect to whether it represents speech activity or non-speech activity; and probable noise parameter calculating means for calculating the average auditory model parameter of noise from a plurality of said auditory model parameters to form an output probable noise parameter when the input signal represents non-speech activity and wherein the auditory model parameter calculating means comprises:

power spectrum calculating means for calculating the power spectrum of the input signal;

critical band integrating means for multiplying the power spectrum calculated by the power spectrum calculating means by a critical band filter function to calculate a pattern of excitation;

equal loudness compensating means for multiplying the pattern of excitation calculated by the critical band integrating means by a compensation factor representing the relationship between the magnitude and equal loudness of a sound for every frequency to calculate a compensated excitation pattern;

removing a noise component corresponding to said probable noise parameter from a compensated excitation pattern;

removing a noise component corresponding to said probable noise parameter from a compensated excitation pattern to calculate a compensated excitation pattern without noise when the input signal represents speech activity; and loudness converting means for converting the power scale of the compensated excitation pattern without noise into a sone scale to calculate a bark spectrum.

11. A signal encoding system as defined in claim 4 wherein the auditory model parameter is a bark spectrum, the frequency spectrum parameter being a frequency spectrum amplitude value, said conversion means being operative to represent the frequency spectrum amplitude value using an approximate formula with a central frequency spectrum amplitude value of the same order as that of the bark spectrum and solving simultaneous equations between the bark spectrum and the central frequency spectrum amplitude value through said approximate formula, thereby converting the bark spectrum into the central frequency spectrum amplitude value, and said central frequency spectrum amplitude value and said approximate formula being used to calculate the frequency spectrum amplitude value.

12. A signal decoding system comprising:

auditory model parameter decoding means for decoding a auditory model parameter encoded from a parameter based on an auditory model to form a decoded auditory model parameter;

converting means for converting said auditory model parameter into a parameter representing the form of a frequency spectrum to form an output frequency spectrum parameter; and synthesis means for generating a decoded signal from said frequency spectrum parameter wherein said converting means comprises:

loudness inverse-conversion means for converting the sone scale of the Bark spectrum into the power scale to calculate a compensated excitation pattern;

equal loudness inverse-compensation means for multiplying said compensated excitation pattern by the inverse number of a compensation factor representing the relationship between the magnitude and equal loudness of a sound for every frequency to calculate an excitation pattern;

power spectrum conversion means for calculating a power spectrum from said excitation pattern and a critical band filter function; and square root means for calculating a square root for each component in said power spectrum to calculate a frequency spectrum amplitude value.

13. A signal decoding system as defined in claim 12 wherein a bark spectrum is used as an auditory model parameter.

14. A signal decoding system as defined in claim 13 wherein a frequency spectrum amplitude value is used as a frequency spectrum parameter.

15. A signal decoding system as defined in claim 12 wherein a frequency spectrum amplitude value is used as a frequency spectrum parameter.

16. A signal decoding system as defined in claim 12 wherein the auditory model parameter is a bark spectrum, the frequency spectrum parameter being a frequency spectrum amplitude value, said conversion means being operative to represent the frequency spectrum amplitude value using an approximate formula with a central frequency spectrum amplitude value of the same order as that of the bark spectrum and solving simultaneous equations between the bark spectrum and the central frequency spectrum amplitude value through said approximate formula, thereby converting the bark spectrum into the central frequency spectrum amplitude value, and said central frequency spectrum amplitude value and said approximate formula being used to calculate the frequency spectrum amplitude value.

* * * * *

UNITED STATES PATENT AND TRADEMARK OFFICE

CERTIFICATE OF CORRECTION

PATENT NO. : 5,864,794
DATED : January 26, 1999
INVENTOR(S) : Hirohisa Tasaki

It is certified that error appears in the above-identified patent and that said Letters Patent is hereby corrected as shown below:

IN THE LETTERS PATENT:

Column 17,
Line 64, (Claim 9, line 1), change "claim 2" to --claim 4--

Column 18,
Lines 33-35 (Claim 10), delete "removing a noise component corresponding to said probable noise parameter from a compensated excitation pattern;

Signed and Sealed this

Twenty-sixth Day of June, 2001

*Attest:*

Nicholas P. Godici

*Attesting Officer*

NICHOLAS P. GODICI
*Acting Director of the United States Patent and Trademark Office*